United States Patent [19]
Tomosue

[11] Patent Number: 5,293,815
[45] Date of Patent: Mar. 15, 1994

[54] EGG BREAKING MECHANISM

[75] Inventor: Shigeo Tomosue, Tsuyama, Japan

[73] Assignee: Kyowa Machinery Co., Ltd., Tsuyama, Japan

[21] Appl. No.: 99,829

[22] Filed: Jul. 30, 1993

[30] Foreign Application Priority Data

Aug. 28, 1992 [JP] Japan .................................. 4-254052

[51] Int. Cl.⁵ .......................... A23J 1/09; A47J 43/14
[52] U.S. Cl. ........................................ 99/498; 99/500
[58] Field of Search ...................... 99/495–500, 99/568, 577–582; 426/490, 614, 478–480

[56] References Cited

U.S. PATENT DOCUMENTS

| | | | |
|---|---|---|---|
| 3,133,569 | 5/1964 | Shelton et al. | 99/499 |
| 3,180,381 | 4/1965 | Shelton | 99/498 |
| 3,480,056 | 11/1969 | Willsey . | |
| 3,589,419 | 6/1971 | Classen | 99/498 |
| 4,137,837 | 2/1979 | Warren | 426/490 X |
| 4,137,838 | 2/1979 | Warren | 99/582 X |
| 4,167,138 | 9/1979 | Warren | 426/299 X |
| 4,534,284 | 8/1985 | Fujimura et al. | 99/498 |
| 4,541,330 | 9/1985 | Fujimura | 99/497 X |
| 4,764,387 | 8/1988 | Willsey | 426/299 |
| 4,773,322 | 9/1988 | Willsey | 99/499 |
| 4,799,423 | 1/1989 | Willsey | 99/497 X |

FOREIGN PATENT DOCUMENTS 1913861 10/1970 Fed. Rep. of Germany ........ 99/498

Primary Examiner—Timothy F. Simone
Attorney, Agent, or Firm—Don J. Flickinger; Jordan M. Meschkow; Lowell W. Gresham

[57] ABSTRACT

An egg breaking mechanism is provided which comprises an egg receiver for receiving an egg thereof, an egg presser arranged above the egg receiver for pressing the egg against the egg receiver, a knife assembly for making a cut in the egg shell, and a cup assembly arranged below the egg receiver for receiving the discharged content of the egg. The egg receiver includes a pair of receiver members movable toward and away from each other, and each of the receiver members has a knife mount which is integrally formed with a lateral pin support tube. The knife assembly includes a pair of knife members each pivotally connected to the knife mount by means of a connecting pin inserted into the pin support tube.

9 Claims, 20 Drawing Sheets

EGG BREAKING MECHANISM

BACKGROUND OF THE INVENTION

1. Field of the Invention

This invention relates to an egg breaking mechanism which can be advantageously incorporated in an automatic egg breaking system for successively breaking eggs and taking out their contents.

2. Description of the Prior Art

As is well known, eggs have found wide use. For example, the egg yolk may be used as a material for making mayonnaise or other food products. The egg albumen may be used for making pharmaceutical products or as a binder for protein products. Due to such wide use of the egg, it is absolutely necessary in industry to use an automatic egg breaking system for breaking eggs and taking out their contents at high speed.

An automatic egg breaking system is disclosed in U.S. Pat. No. 3,480,056 for example. The egg breaking system of this U.S. patent comprises a circulating transfer mechanism which carries a plurality of egg breaking mechanisms at a constant pitch. Each of the egg breaking mechanisms is made to receive an egg from an egg supply unit and break the egg while the egg breaking mechanism moves along the transfer path.

Each of the egg breaking mechanisms disclosed in the above U.S. patent comprises an egg receiver for receiving an egg thereon, an egg presser arranged above the egg receiver for pressing the egg against the egg receiver, a knife assembly for making a cut in the egg shell, and a cup assembly arranged below the egg receiver for receiving the discharged content of the egg. The egg receiver includes a pair of receiver members movable toward and away from each other. The knife assembly includes a pair of knife members pivotally connected to the respective receiver members. The cup assembly is made to separate the egg content into a yolk portion and an albumen portion.

In the prior art egg breaking mechanism, each of the receiver members has a downwardly open channel-form bracket, whereas each of the knife member has an upwardly open channel-form bracket. The respective brackets are joined to define a rectangular space, and connected together by a transverse pivot pin to establish pivotal connection between each receiver member and the corresponding knife member.

According to the prior art, it is difficult to make access, for cleaning purposes, to the rectangular space which is defined by the respective channel-form brackets and transversed by the pivot pin. Thus, the prior art egg breaking mechanism has been found to have a hygienic problem particularly in view of the fact that egg residues are suitable for bacterial breeding.

SUMMARY OF THE INVENTION

It is, therefore, an object of the present invention to provide an egg breaking mechanism which can be easily washed, particularly with respect to easily contaiminated components such as an egg receiver and a knife assembly, to keep a hygienically good condition.

Another object of the present invention is to provide an egg breaking mechanism incorporating a cup assembly which is capable of rapidly and effectively separating the yolk and albumen of an egg after its cracking.

According to the present invention, there is provided an egg breaking mechanism comprising: a support; an egg receiver mounted to the support for receiving an egg, the egg receiver including a pair of receiver members movable toward and away from each other, each of the receiver members having a knife mount; an egg presser mounted to the support above the egg receiver for pressing the egg against the egg receiver; a knife assembly including a pair of knife members each pivotally connected to the knife mount; and a cup assembly mounted to the support below the egg receiver for receiving a discharged content of the egg; wherein the knife mount of said each receiver member is integrally formed with a laterally extending pin support tube, each of the knife members is pivotally connected to the knife mount by means of a connecting pin inserted into the pin support tube.

Preferably, the pair of receiver members are swingably supported on a common center shaft fixed to the support. In this case, it is advantageous that the pair of receiver members be urged toward each other by a return spring which has a central arcuate portion arranged to clear the common center shaft, and a pair of side arcuate portions continuous with the central arcuate portion.

According to a preferred embodiment of the present invention, the cup assembly comprises a separating cup arranged at a higher position and an albumen cup arranged at a lower position, and the separating cup is formed with a separation slot which progressively reduces in width in a downward direction. The separation slot may be V-shaped or U-shaped.

Other objects, features and advantages of the present invention will become apparent from the following detailed description of the preferred embodiments given with reference to the accompanying drawings.

DETAILED DESCRIPTION OF THE PREFERRED EMBODIMENTS

Figure 1:
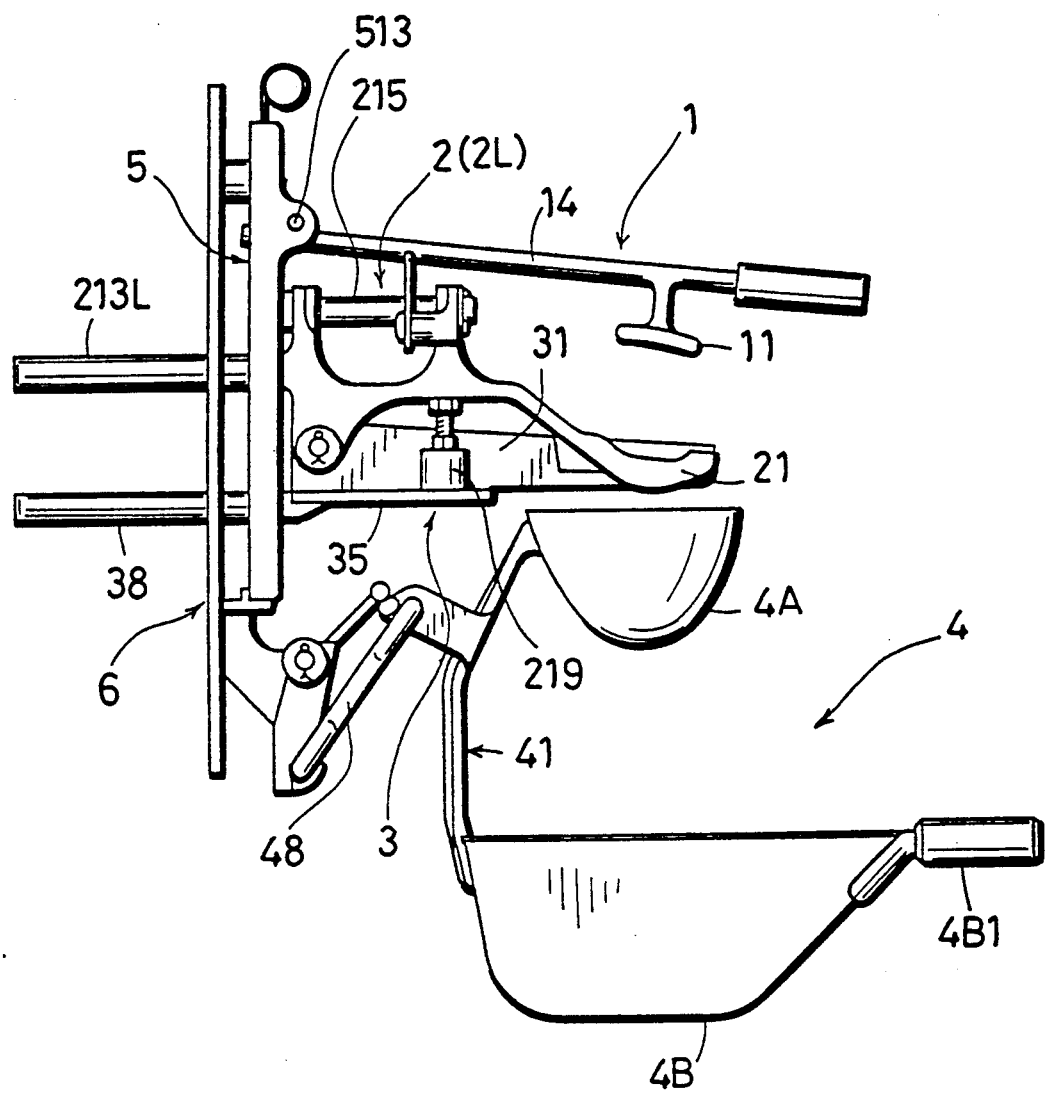
FIG. 1 is a side view showing the entirety of an egg breaking mechanism according to the present invention.

Referring first to FIG. 1 of the accompanying drawings, a preferred egg breaking mechanism according to the present invention mainly comprises an egg presser 1, an egg support 2, a knife assembly 3, and a cup assembly 4. The egg presser 1, the egg receiver 2 and the knife assembly 3 are supported by a base member 5, whereas the cup assembly 4 and the base member 5 are supported by a base mount 6. Each of these components is advantageously made of stainless steel by precision molding.

When incorporated into the overall egg breaking system, the base mount 6 is removably fixed to a transfer mechanism (including an endless chain conveyor for example) together with the base mounts for other identically configured egg breaking mechanisms. Thus, the egg breaking system is capable of successively breaking eggs and taking out their contents at the respective egg breaking mechanisms.

Figure 2:
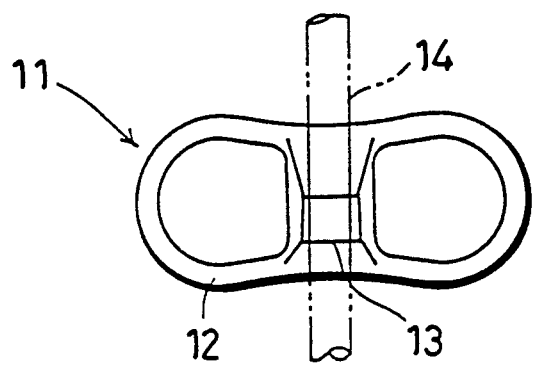
FIG. 2 is a plan view showing an egg presser incorporated the egg breaking mechanism.
Figure 3:
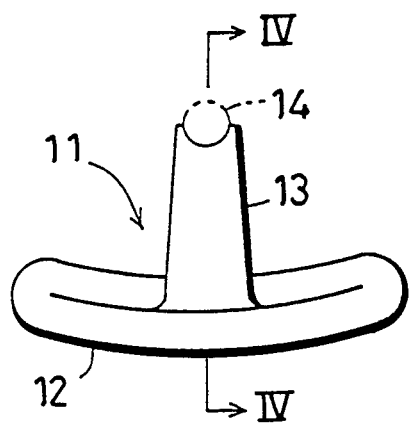
FIG. 3 is a front view showing the egg presser.
Figure 4:
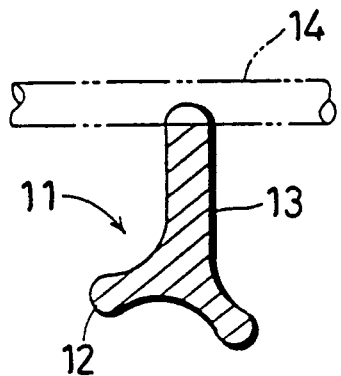
FIG. 4 is a sectional view taken along lines IV—IV in FIG. 3.

The egg presser 1 is specifically shown in FIGS. 2 through 4. The egg presser 1 functions to press an egg E (see FIG. 29) against with the egg receiver 2 for holding. The egg presser 1 includes a presser head 11 and a pivotal rod 14. The presser head 11 includes a laterally oblong head ring 12 for contact with the egg and a post 13 for connecting the head ring 12 to the pivotal rod 14 by welding for example. The head ring 12 is downwardly concave in sectional shape (see FIG. 4) but downwardly convex in front view (see FIG. 3) so that it can conveniently adapted to stably press eggs of various sizes and/or shapes. The pivotal rod 14 is pivotally connected to the base member 5.

Figure 5:
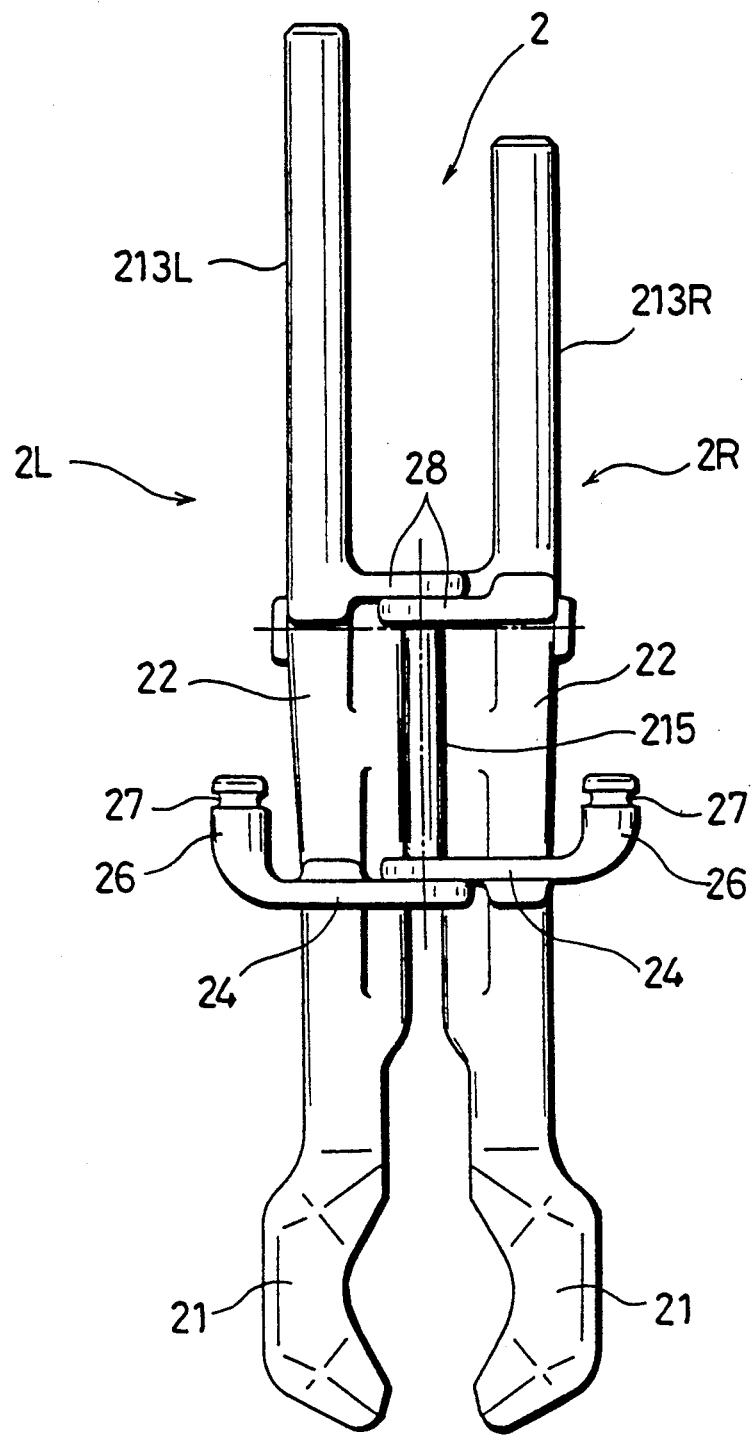
FIG. 5 is a plan view showing an egg receiver incorporated in the egg breaking mechanism.
Figure 6:
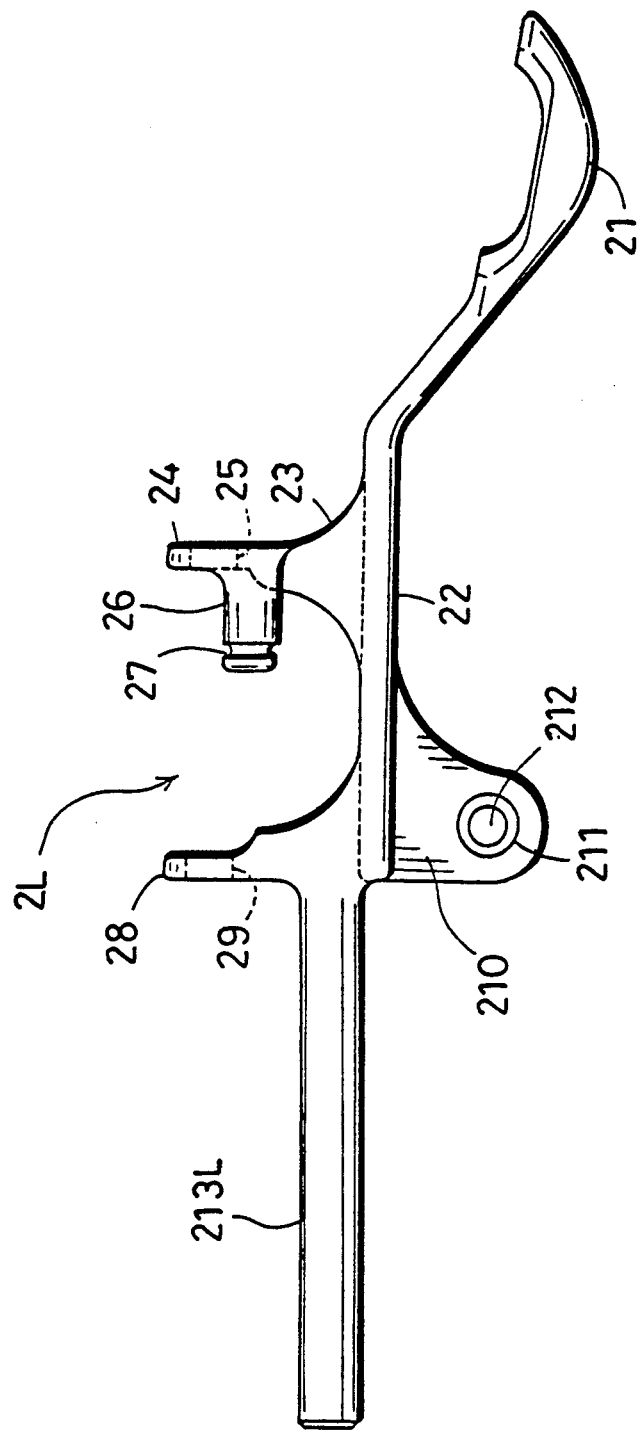
FIG. 6 is a side view showing a left receiver member of the egg receiver.
Figure 7:
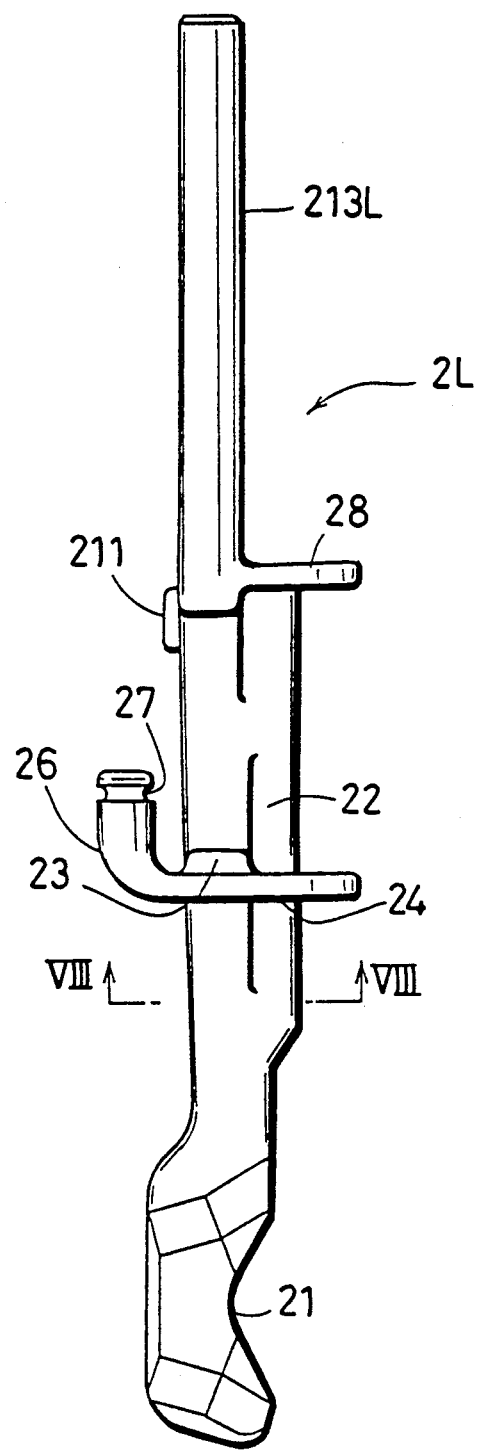
FIG. 7 is a plan view showing the same receiver member.
Figure 8:
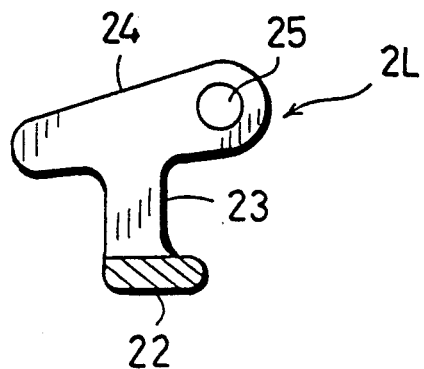
FIG. 8 is a sectional view taken along lines VIII—VIII in FIG. 7.

As illustrated in FIG. 5, the egg receiver 2 comprises a right receiver member 2R and a left receiver member 2L. These receiver members have their respective follower rods 213R, 213L which differ in length to be guided by different guide rails or cam tracks (not shown) for opening and closing the receiver members as the unillustrated transfer mechanism advances. The respective receiver members 2R, 2L are otherwise similar in configuration. Thus, only the left receiver member 2L is described below.

As shown in FIGS. 6 through 9, the left receiver member 2L has an swing arm 22 integral with the follower rod 213L. The arm 22 has a front end formed integrally with a seat 21 for receiving or supporting the egg thereon. An intermediate portion of the swing arm 22 is formed integrally with an upright front post 23 which in turn is formed integrally with a front bracket 24. One end of the front bracket 24 is provided with a front shaft hole 25, whereas the other end of the front bracket 24 is formed integrally with a spring mount projection 26 extending rearwardly. The spring mount projection 26 has an annular engaging groove 27.

Figure 9:
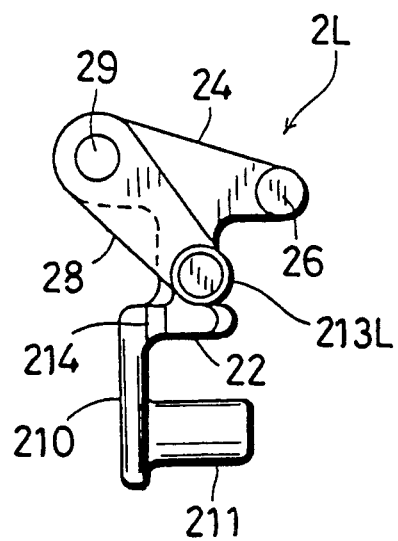
FIG. 9 is a rear view of the same receiver member.

At the position of transition to the follower rod 213L, the swing arm 22 is formed integrally with a rear bracket 28 extending obliquely (see FIG. 9). The rear bracket 28 has a tip end formed with a rear shaft hole 29 in axial alignment with the front shaft hole 25. The front and rear shaft holes 25, 29 are used for pivotally mounting the left receiver member 2L, together with the right receiver member 2R, on a common center shaft 215 (see FIGS. 1 and 2) fixed perpendicularly to the base member 5. Thus, the respective receiver members 2R, 2L are openable and closable (namely, movable toward and away from each other) by pivoting about the center shaft 215.

The swing arm 22 is also formed integrally with a knife mount 210 projecting downward from the underside of the swing arm. The knife mount 210 has an integral pin support tube 211 extending laterally from the knife mount and having an axial through-hole 212. Indicated at 214 in FIG. 9 is a vertical engaging groove provided at the rear edge of the swing arm 22.

Figure 10:
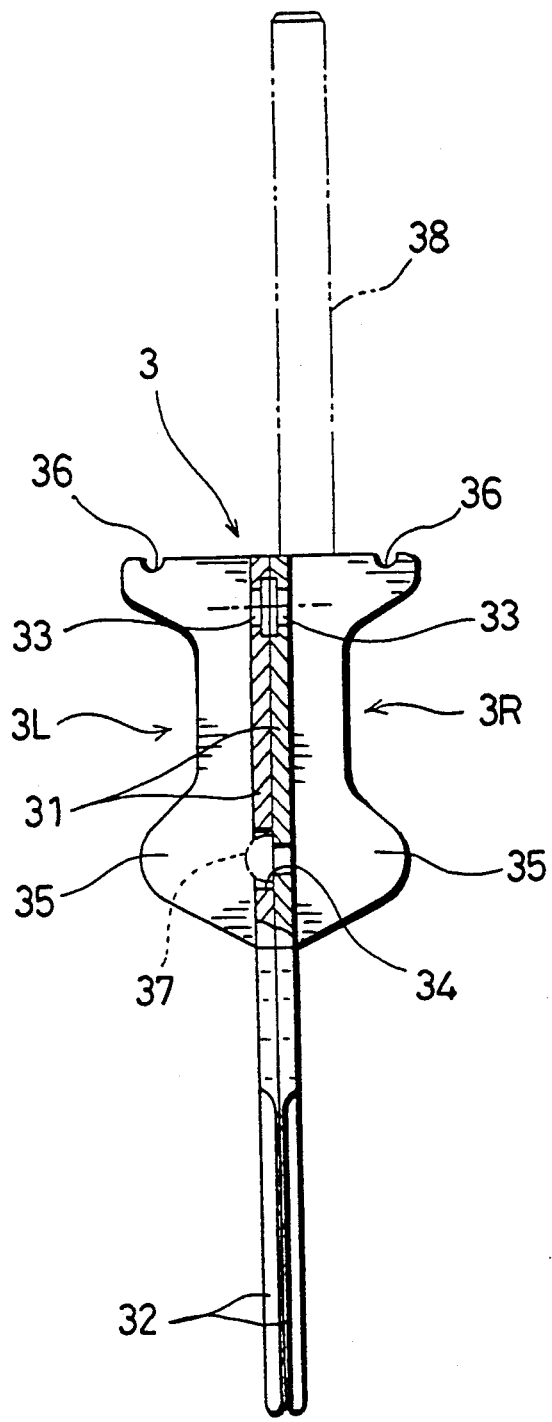
FIG. 10 is a plan view, partially in section, showing a knife assembly incorporated in the egg breaking mechanism.

The knife assembly 4 comprises a right knife member 3R and a left knife member 3L cooperative with the right knife member, as shown in FIG. 10. The right knife member 3R is associated with the right receiver member 2R, whereas the left knife member 3L is associated with the left receiver member 2L. The respective knife members 3R, 3L are movable toward and away from each other together with the respective receiver members 2R, 2L, as described later.

Figure 11:
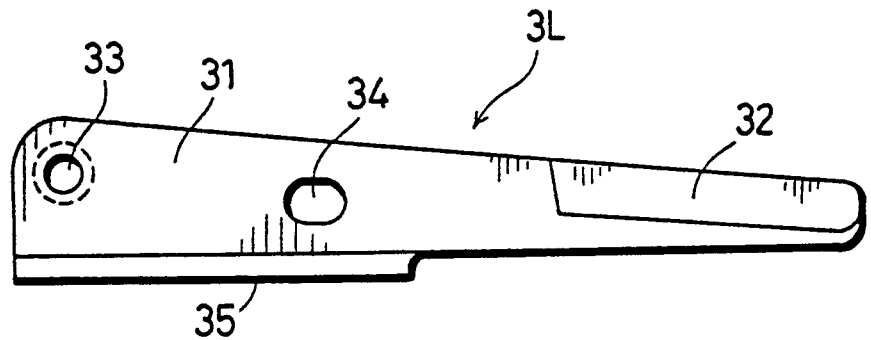
FIG. 11 is a side view showing a left knife member of the knife assembly.
Figure 12:
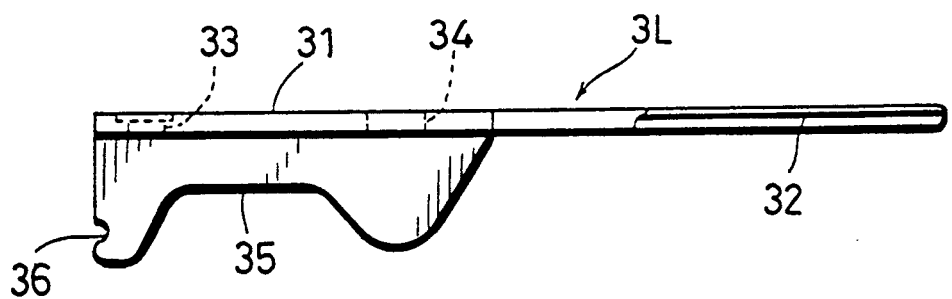
FIG. 12 is a plan view of the same knife member.
Figure 13:
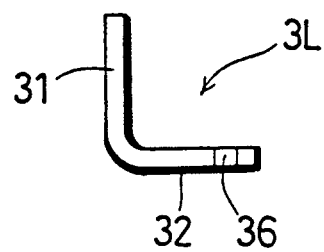
FIG. 13 is a rear view of the same knife member.

As shown in FIGS. 11 through 13, the left knife member 3L comprises a blade 31 having a cutting edge 32 at one end and a stepped hole 33 at the other end. Between the cutting edge 32 and the stepped hole 33 is provided a guide hole 34. Further, the left knife member 3L comprises an integral wing 35 projecting substantially perpendicularly to the blade 31. Thus, the combination of the blade 31 and the wing 35 provide an L-shaped cross section, as can be clearly seen in FIG. 13. The wing 35 is formed, at its rear edge, with an engaging recess 36.

Returning to FIG. 10, the configuration of the right knife member 3R is similar to that of the left knife member 3L in symmetrical relation thereto except for two points. First, instead of the guide hole 34 of the left knife member 3L, the right knife member 3R carries a guide pin 37 which is fittable into the guide hole 34 when the respective knife members are brought toward each other. Secondly, the right knife member 3R is welded to a follower rod 38 extending rearwardly in parallel to the follower rods 213R, 213L of the respective receiver members 2R, 2L (see FIG. 1).

Figure 14:
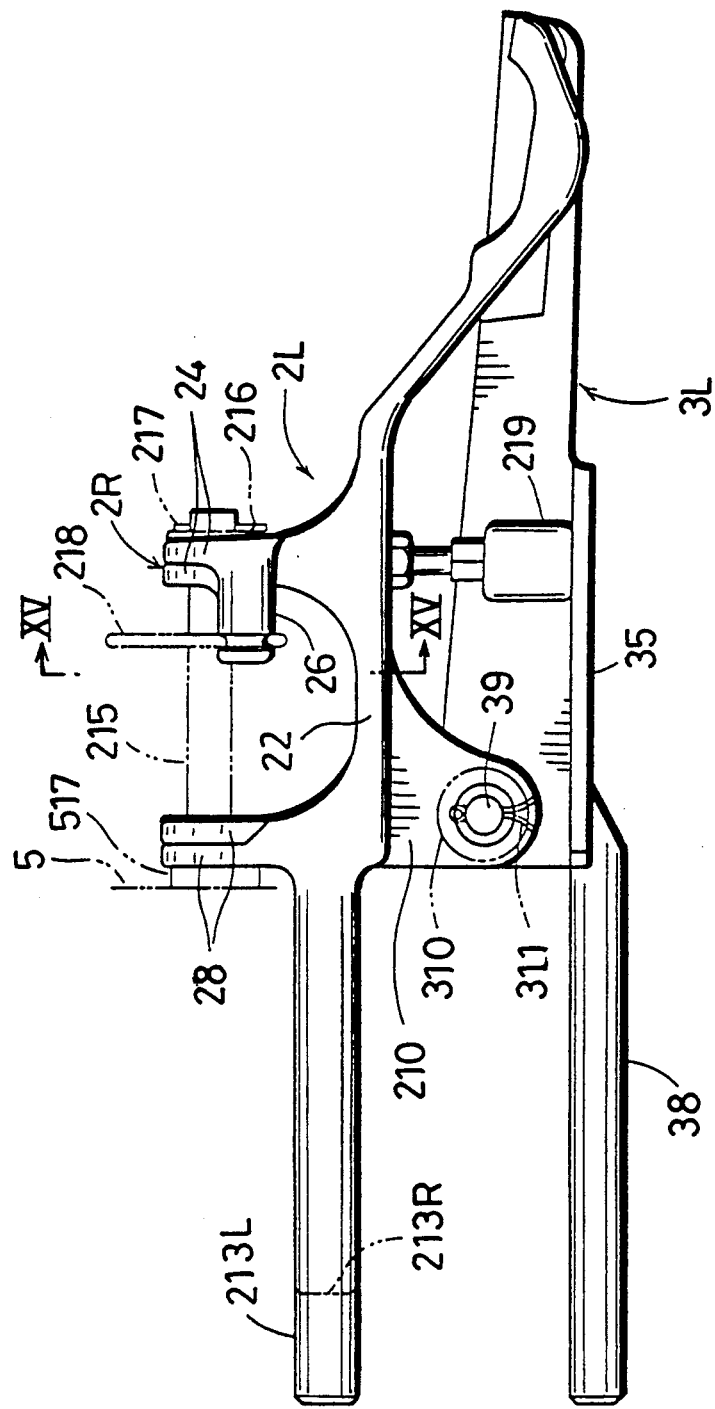
FIG. 14 is a side view showing the combination of the egg support and the knife assembly.
Figure 15:
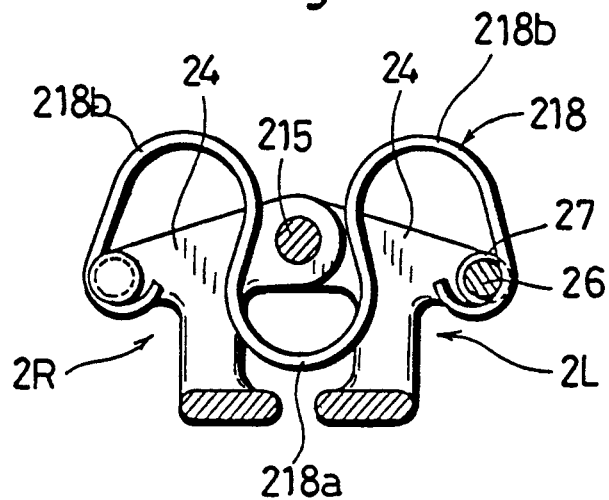
FIG. 15 is a sectional end view taken along lines XV—XV in FIG. 14.
Figure 16:
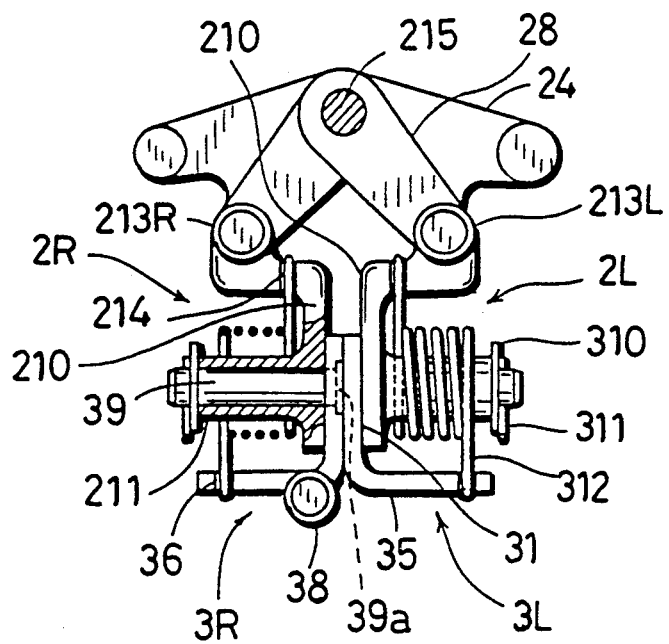
FIG. 16 is a rear view showing the same combination of the egg support and the knife assembly.
Figure 17:
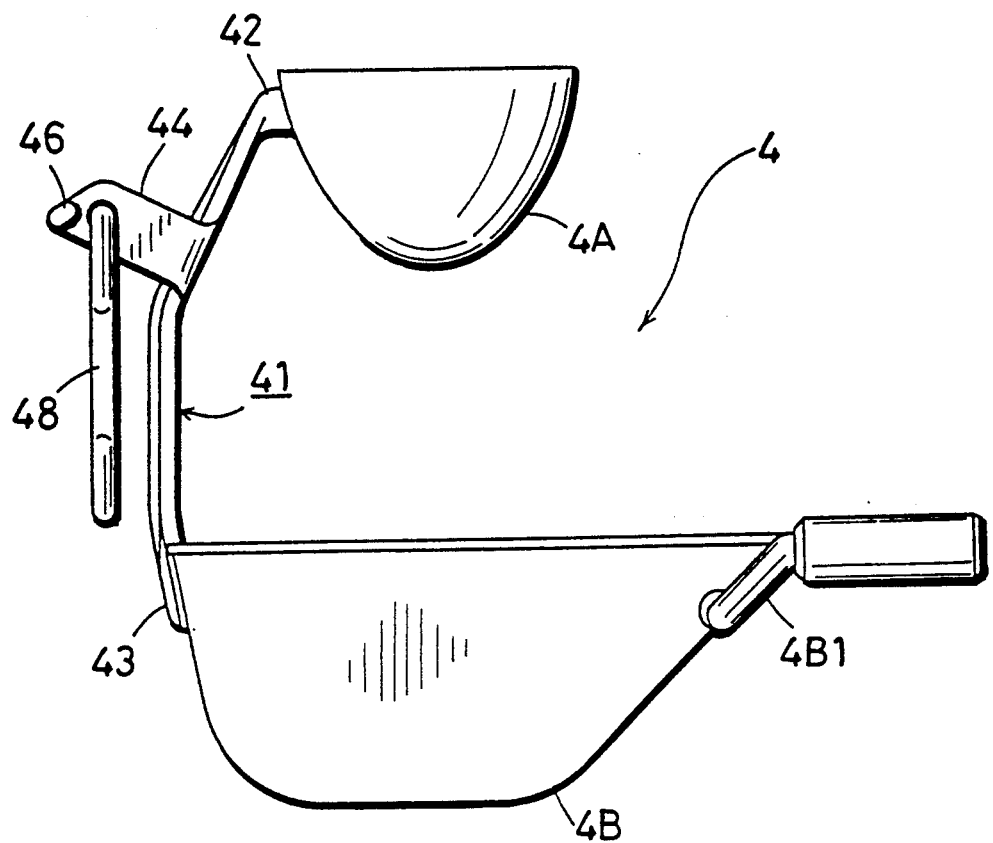
FIG. 17 is a side view showing a cup assembly incorporated in the egg breaking mechanism.
Figure 18:
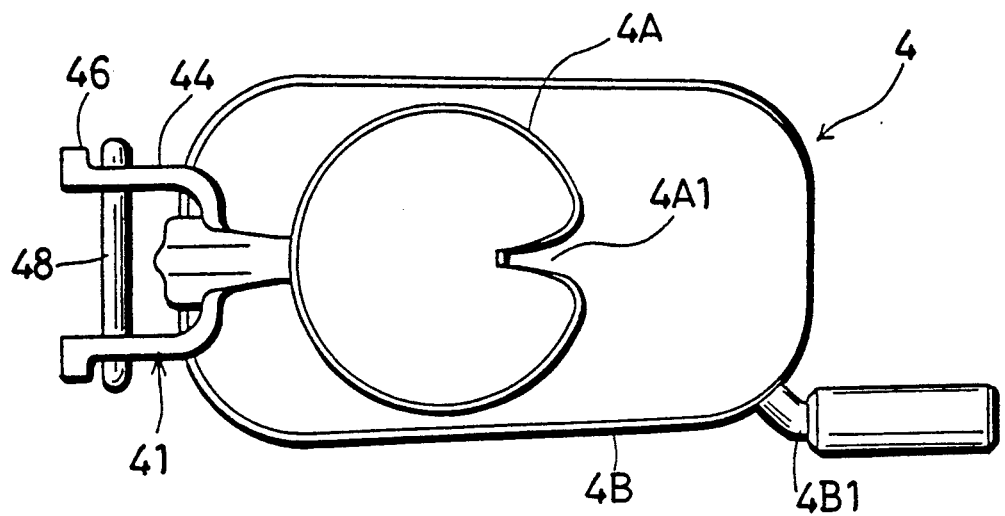
FIG. 18 is a plan view of the cup assembly.
Figure 19:
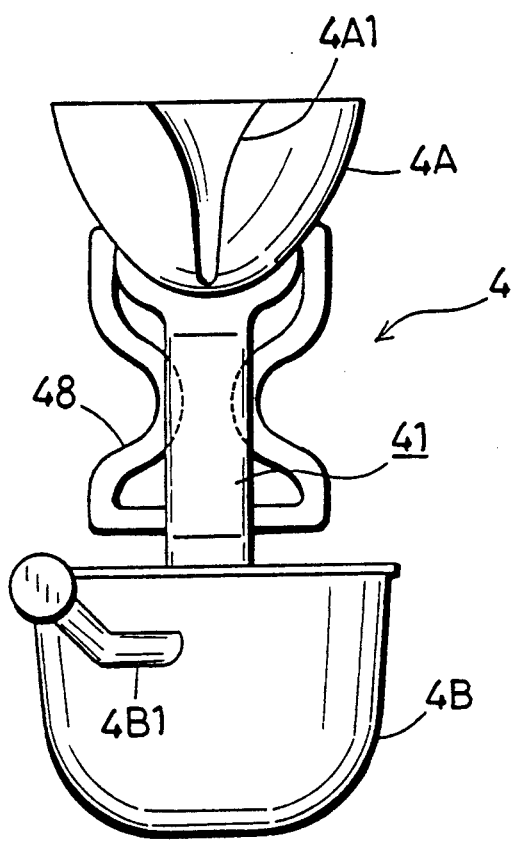
FIG. 19 is a front view of the cup assembly.

Referring to FIGS. 14 through 16, the right and left receiver members 2R, 2L are pivotally supported on the common center shaft 215 which extends forwardly from the base member 5 (FIG. 14), as previously described. The respective receiver members 2R, 2L are prevented from axially coming off the center shaft 215 by a combination of a washer 216 and a cotter pin 217 provided at the forward end of the shaft.

The right and left receiver members 2R, 2L are always urged to their respective closed position (FIG. 16) by means of an arm return spring 218 each end of which engages the annular engaging groove 27 of the corresponding spring mount projection 26, as shown in FIGS. 14 and 15. As shown in FIG. 15, the arm return spring 218 has a central arcuate portion 218a located to clear the common central shaft 215, and a pair of side arcuate portions 218b continuous with the the central arcuate portion 218a. The respective arcuate portions 218a, 218b of the arm return spring are contained in a single plane. Obviously, since the arm return spring 218 has no coil portion, it can be easily washed while facilitating its mounting operation.

Each of the knife members 3R, 3L is pivotally connected to the knife mount 210 of the corresponding receiver member 2R, 2L by means of a connecting pin 39 inserted into the pin support tube 211, as best shown in FIG. 16. More specifically, one end of the connecting pin 39 has an engaging head 39a anchored in the stepped hole 33 (see FIGS. 11 and 12) of the knife blade 31, whereas the other end of the connecting pin 39 is provided with a combination of a washer 310 and a cotter pin 311.

Each of the knife members 3R, 3L is always urged pivotally upward (namely, in an egg knifing direction) by a knife return spring 312, as also shown in FIG. 16. The knife return spring 312 is in the form of a coil spring fitted around the pin support tube 211 of the corresponding receiver member 2R, 2L. One end of the return spring 312 engages the vertical engaging groove 214 at the rear edge of the swing arm 22 (see also FIG. 9), whereas the other end of the return spring 312 engages the engaging recess 36 at the rear edge of the knife wing 35.

As shown in FIGS. 1 and 14, each of the receiver members 2R, 2L is provided with an adjustable stopper 219 extending downward from the swing arm 22 for stopping contact with the wing 35 of the corresponding knife member 3R, 3L. Thus, the knife member is prevented from excessively pivoting upward, and the degree of egg knifing is adjustable.

FIGS. 17 through 23 illustrate the cup assembly 4 which mainly comprises a separating cup 4A, an albumen cup 4B, and a cup mount 41.

Figure 20:
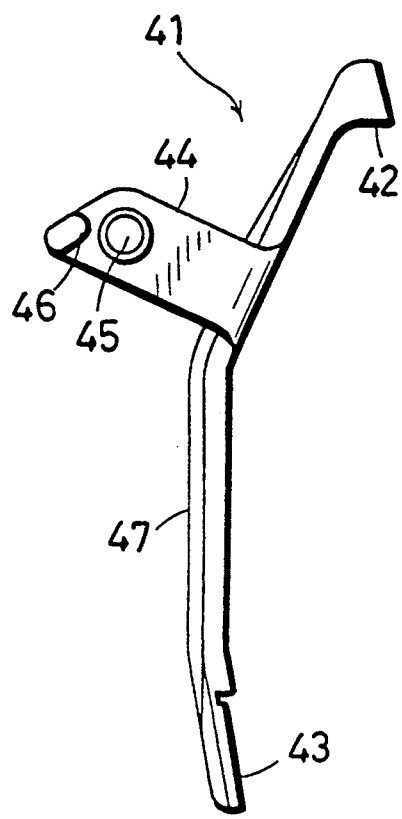
FIG. 20 is a side view showing a cup support of the cup assembly.
Figure 21:
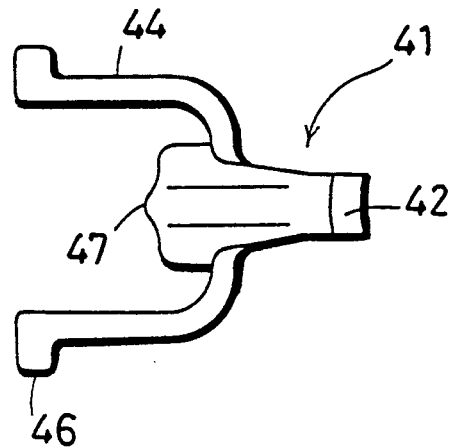
FIG. 21 is a plan view of the cup support.
Figure 22:
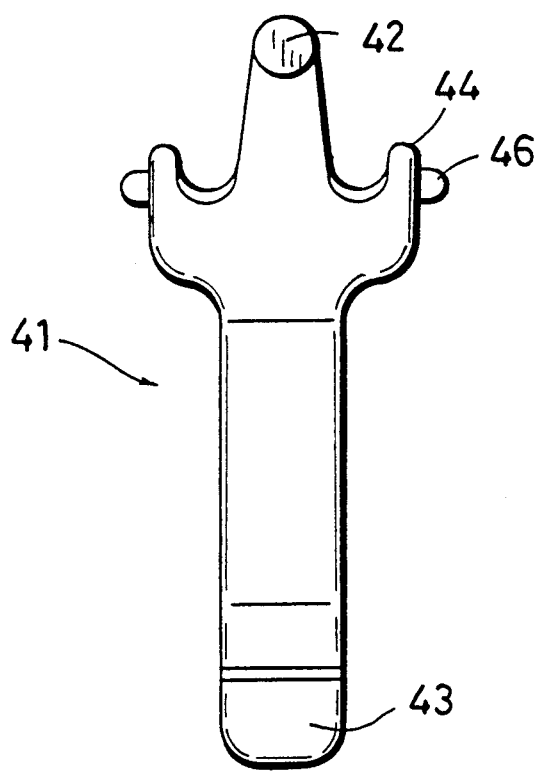
FIG. 22 is a front view of the cup support.

The cup mount 41 is generally bow-shaped (or bent at an obtuse angle) and reinforced by a longitudinal rib 47 (FIGS. 20 and 21). The cup mount 41 has an upper mounting end 42 for attachment to the separating cup 4A, and a lower mounting end 43 for attachment to the while cup 4B. The attachment of the respective cups 4A, 4B may be performed by welding for example.

An intermediate portion of the cup mount 41 is integrally formed with a pair of stays 44 projecting obliquely rearward and upward. Each of the stays 44 has a mounting hole 45 (FIG. 20) for connection to a pivotal prop 48 (FIGS. 17-19), and a stopper projection 46 (FIGS. 20-22) directed laterally outward. The function of the prop 48 and stopper projection 46 will be described later.

The separating cup 4A attached to the upper mounting portion 42 of the cup mount 41 is generally hemispherical. A front wall portion of the separating cut 4A is formed with a generally V-shaped or U-shaped separation slot 4A1 which progressively reduces in width in the downward direction. The separation slot 4A1 selectively discharges the egg albumen while retaining the egg yolk in the separating cup 4A. The separation slot 4A1 is rendered wider toward the brim of the cup, so that the discharge speed of the egg albumen is accelerated.

The albumen cup 4B attached to the lower mounting end 43 of the cup mount 41 is generally in the form of a bath tub. Being located immediately under the separating cup 4A, the albumen cup 4B receives the egg white discharged through the separation slot 4A1 of the separating cup 4A. A control rod 4B1 is welded to a front portion of the albumen cup 4B for controlling the position and inclination of the cup assembly 4, as described hereinafter.

Figure 23:
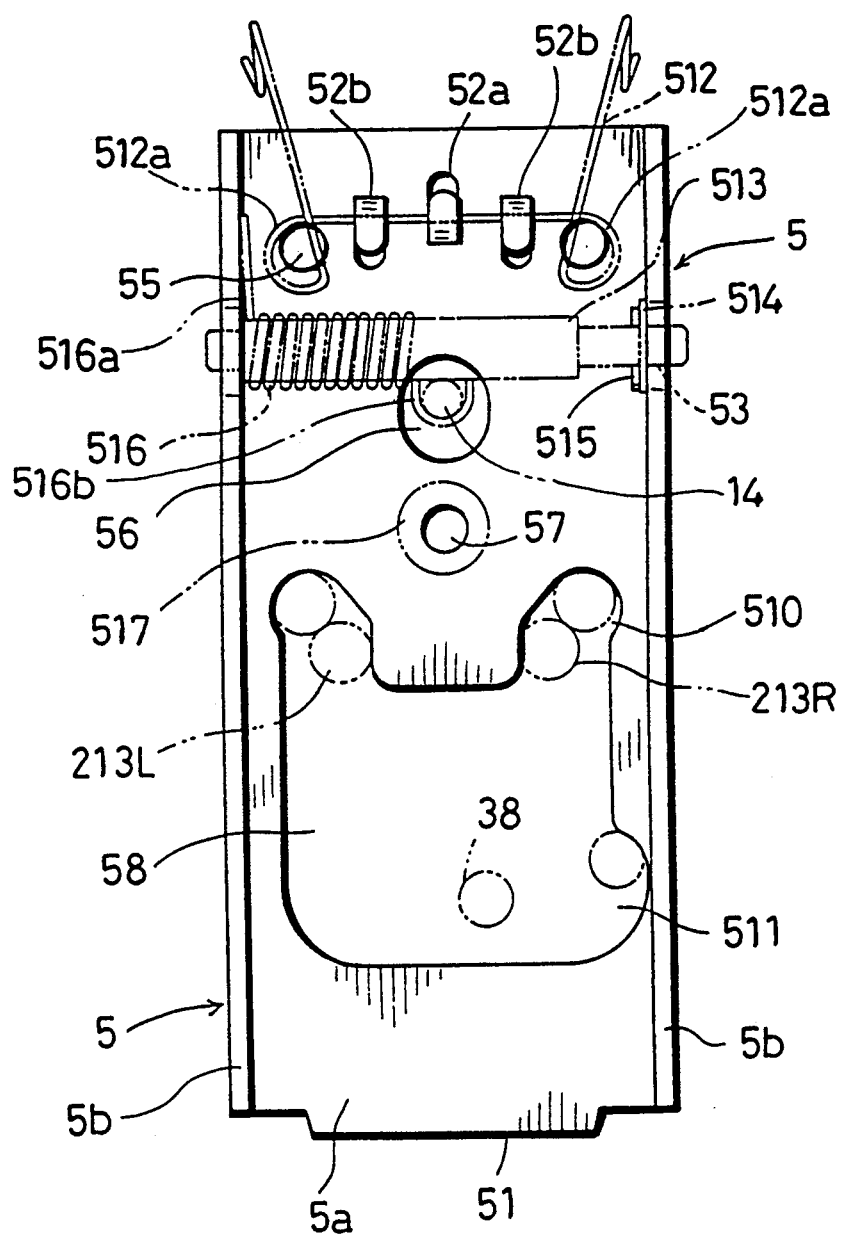
FIG. 23 is a front view showing a base member incorporated in the egg breaking mechanism.
Figure 24:
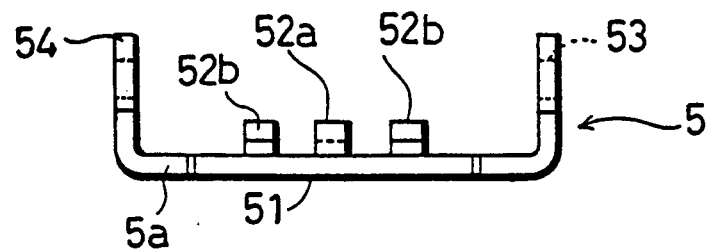
FIG. 24 is a plan view of the base member.
Figure 25:
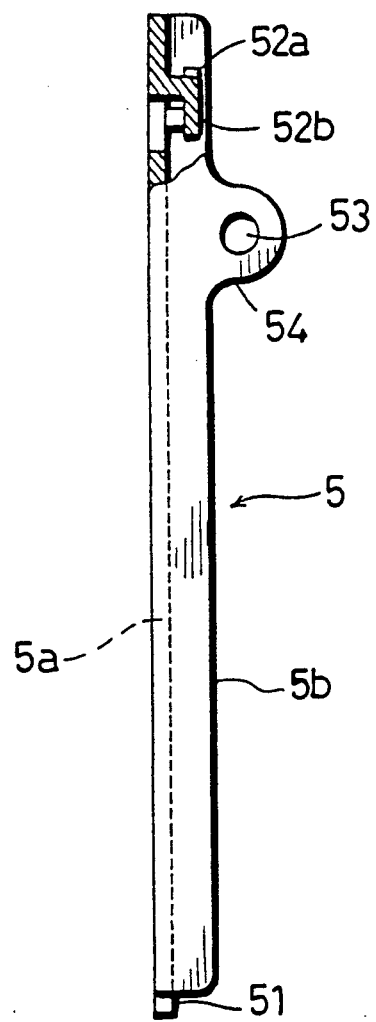
FIG. 25 is a side view of the base member.

As shown in FIGS. 23 through 25, the base member 5 is made of a channel member which includes a main wall 5a and a pair of integral side walls 5b. The main wall 5a has a lower fitting projection 51 which is used for fixing the base member 5 to the base mount 6. The main wall 5a is also provided, at an upper portion thereof, with an upwardly directed central pawl 52a and a pair of downwardly directed side pawls 52b. These pawls 52a, 52b are used for removable engagement with a retainer spring 512 (FIG. 23) having a pair of loop portions 512a adjacent to the respective side walls 5b. The main wall 5a is further formed with a pair of side bores 55 in corresponding relation to the respective loop portions 512a of the retainer spring 512.

Slightly below the pawls 52a, 52b, the side walls 5b of the base member 5 are each provided with an integral bracket 54 having a shaft hole 53 for rotatably receiving a pivot shaft 513 (FIG. 23). The pivot shaft 513 is held in place by a combination of a washer 514 and a cotter pin 515.

As shown in FIG. 23, the pivot shaft 513 is centrally fixed to the pivotal rod 14 of the egg presser 2 near the rear end thereof (see also FIG. 1). The pivot shaft 513 is always urged by a pressing spring 516 in a rotational direction for pivoting the pivotal rod 14 downward. The pressing spring 516, which includes a coil portion fitted around the pivot shaft 513, has a straight first end 516a engaging the main wall 5a of the base member 5, and a second hook end 516b engaging the pivotal rod 1.

Downward pivotal movement of the egg presser 2 (namely, the pivotal rod 14) is limited by a limiter opening 56 formed in the main wall 5a of the base member 5 adjacent to the pivot shaft 513 slightly thereunder. Specifically, the rear end of the pivotal rod 14 penetrates through the limiter opening 56, so that the downward pivotal movement of the egg presser 2 is limited when the rear end of the pivotal rod 14 comes into engagement with the upper edge of the limiter opening 56.

Immediately under the limiter opening 56 is provided a shaft anchor ring 517 welded to the main wall 5a of the base member 5 and having a bore 57. The common center shaft 215 is received in the bore 57 and fixed thereto by welding.

As also shown in FIG. 23, a follower take-out opening 58 is formed in the main wall 5a of the base member 5 between the shaft anchor ring 517 and the lower fitting projection 51 to allow penetration of the follower rods 38, 213R, 213L. The follower take-out opening 58 has a pair of upper corner guide portions 510 for guiding and limiting the swinging movement of the follower rods 213R, 213L of the respective receiver members 2R, 2L (namely, the swing arms 22). The follower take-out opening 58 has a lower corner guide portion 511 for guiding and limiting the movement of the follower rod 38 of the right knife member 3R.

Figure 26:
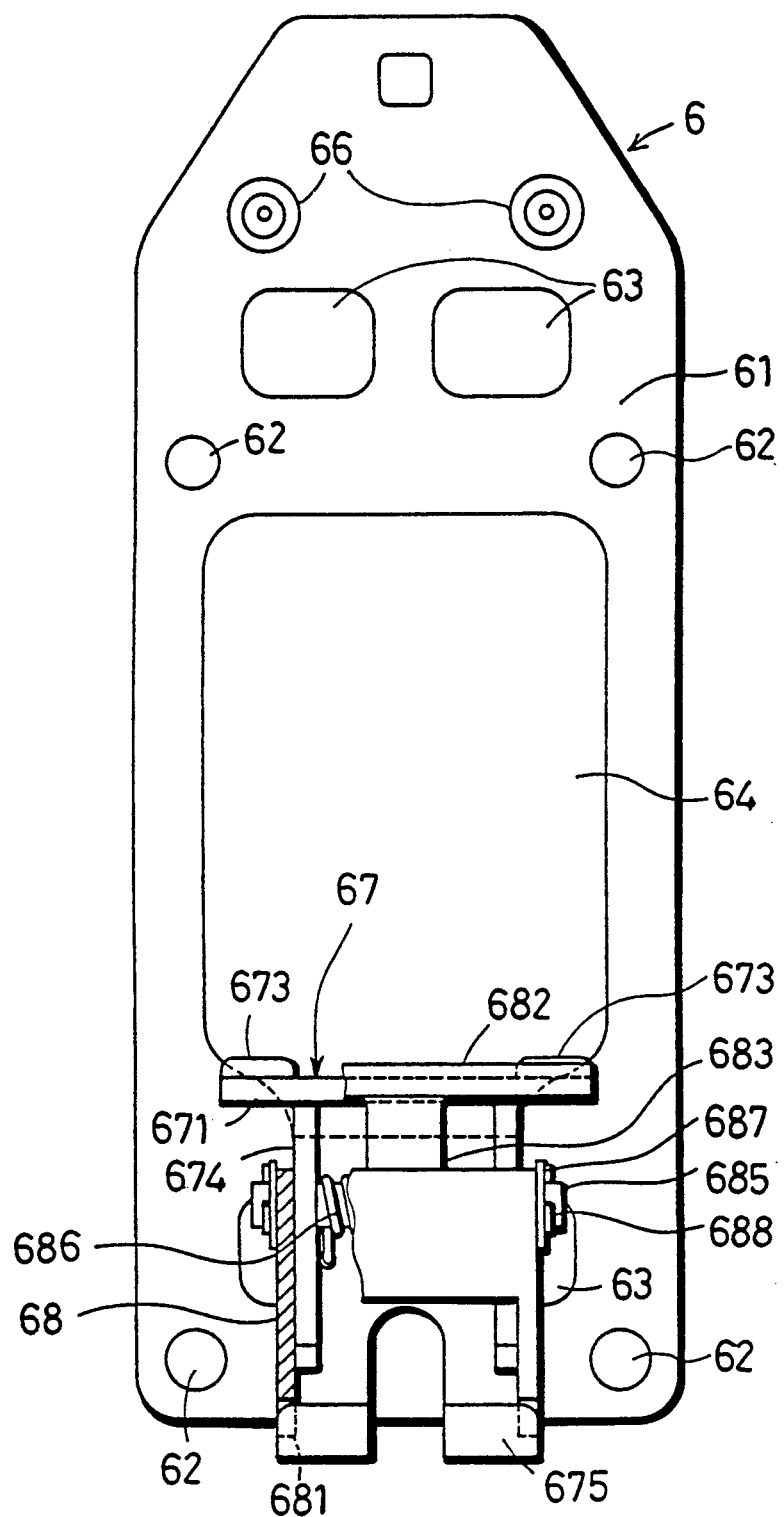
FIG. 26 is a front view showing a base mount incorporated in the egg breaking mechanism.
Figure 27:
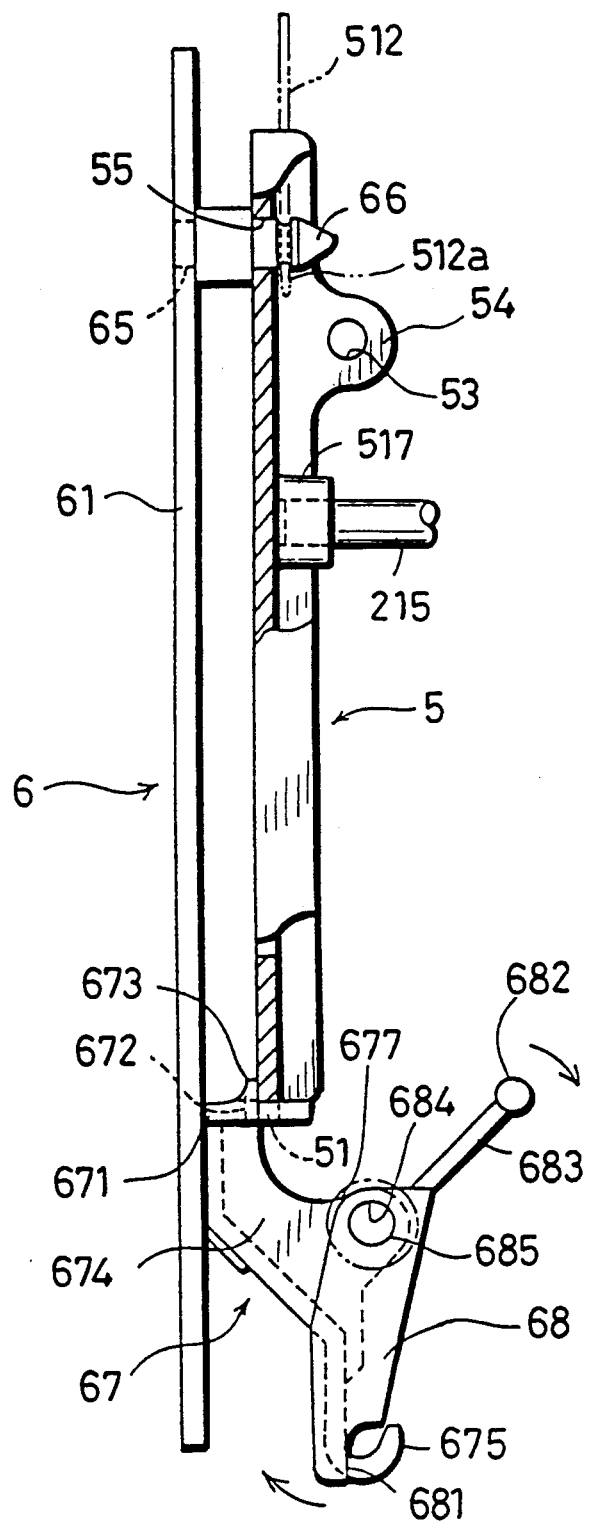
FIG. 27 is a side view showing the same base mount with the mounted base member.
Figure 28:
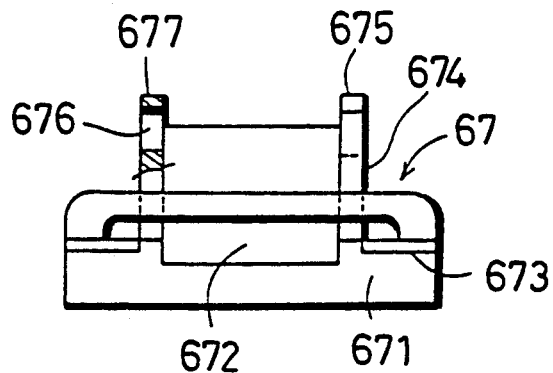
FIG. 28 is a bottom view showing a cup mounting portion of the base mount.

As shown in FIGS. 26 through 28, the base mount 6 comprises a mount wall 61 which is provided with four bolt holes 62 for removably fixing the base mount 6 to the unillustrated transfer mechanism such as an endless chain conveyor. The mount wall 61 is also provided with a plurality of shelter openings 63 (two upper and one lower) for avoiding interference of the base mount 6 with certain components of the unillustrated transfer mechanism. The mount wall 61 is further formed with a central follower take-out opening 64 for allowing penetration and movement of the respective follower rods 38, 213R, 213L.

As shown in FIG. 27, a pair of mounting holes 65 are provided at an upper portion of the mount wall 61 for receiving a corresponding pair of engaging pins 66 each fixed by welding for example. The respective engaging pins 66 are removably engageable with the respective loop portions 512a (see also FIG. 23) of the retainer spring 512 for fixing the base member 5.

At a lower portion of the base mount 6, there is provided a mounting assembly 67 which is used for mounting the base member 5 and the cup assembly 4. The mounting assembly 67 includes a support shelf 671 welded to the mount wall 61, and a forwardly open channel-form leg member 674 welded to the mount wall 61 and the underside of the shelf 671.

The support shelf 671 is provided with a fitting slot 672 for removable engagement with the fitting projection 51 of the base member 5. The support shelf 671 is also provided with stopper flanges 673 for engagement with the main wall 5a of the base member 5. In this way, the support shelf 671 functions to support and fix the base member 5 in combination with the retainer pins 66 and the retainer spring 512.

The leg member 674 has a lower end provided with a pair of upwardly directed hooks 675 for engagement with the pivotal prop 48 of the cup assembly 4 (see FIG. 1). The leg member 674 further has an intermediate portion provided integrally with a pair of forwardly projecting brackets 677 each having a shaft hole 676 (see FIG. 28) for receiving a pivot shaft 685.

A rearwardly open channel-form retainer member 68 is pivotally supported on the pivot shaft 685 at respective shaft holes 684. The retainer member 68 has a lower end provided with a pair of pawls 681 cooperative with the hooks 675 for retaining the pivotal prop 48 of the cup assembly 4.

A stay 683 extends obliquely upward and forward from a central portion of the retainer member 68 to carry a substantially horizontal stopper bar 682 which comes into abutment with the stopper projections 46 of the cup mount 41 (see FIGS. 1 and 17 ∝ 22) for preventing the cup assembly 4 from moving excessively upward. A return coil spring 686 is fitted around the pivot shaft 685 to urge the retainer member 68 in such a direction as to pivot the pawls 681 forwardly. The pivot shaft 686 is prevented from axial displacement by a combination of a washer 687 and a cotter pin 688.

In operation for egg breaking, the illustrated egg breaking mechanism is transferred at a constant speed by the unillustrated transfer mechanism together with other identically configured egg breaking mechanisms. During such transfer, various guide rails or cam tracks (not shown) extending along the transfer path control the pivotal movement of the egg presser 1, the opening and closing movement of the egg receiver 2 and knife assembly 3 (namely, the follower rods 213R, 213L of the respective receiver members 2R, 2L), the pivotal movement of the knife assembly 3 (namely, the follower rod 38 of the knife assembly 3), and the position and inclination of the cup assembly 4 (namely, the control rod 4B1 of the cup assembly 4).

Figure 29:
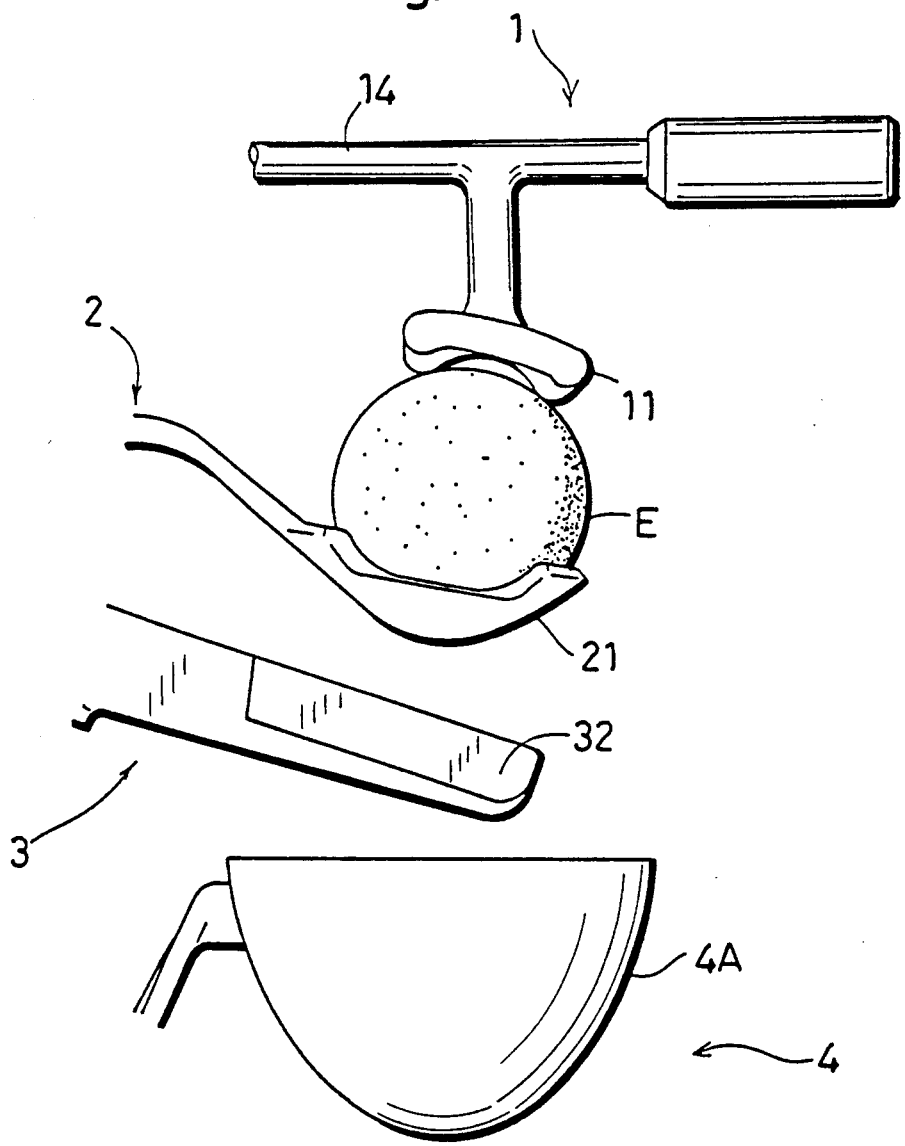
FIG. 29 is an enlarged side view showing a principal portion of the egg breaking mechanism at the time of holding an egg for breaking.

FIG. 29 illustrates the condition immediately after the egg receiver 2 in its closed state has received an egg E from an egg supply unit (not shown). In this condition, the egg presser 1, which was previously pivoted upward at the time of accepting the egg, is pivotally lowered for holding the egg E in cooperation with the the egg receiver 2, and the knife assembly 3 is pivotally lowered. Further, the cup assembly 4 is also lowered to avoid interference with the lowered knife assembly 3.

Figure 30:
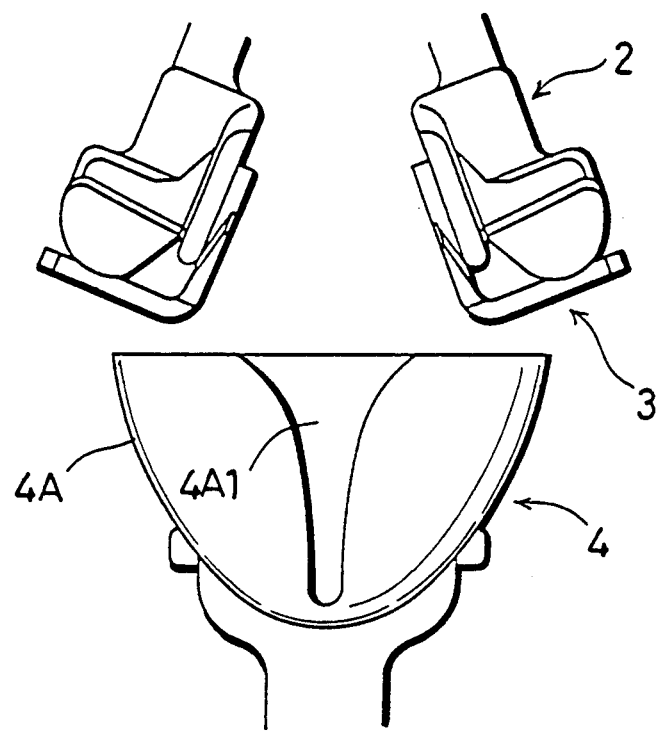
FIG. 30 is a front view showing the same principal portion in an open condition.

Then, the knife assembly 3 is pivotally raised to form a cut in the egg shell, which is followed by an opening movement of the egg receiver 3, as shown in FIG. 30. As a result, the egg E is broken to discharge its content to the cup assembly 4 which has been raised by this time. The egg content is separated by the separation slot 4A1 of the separating cup 4A into a yolk held by the separating cup 4A and an albumen received by the albumen cup 4B, as described hereinbefore.

Finally, the cup assembly 4 is tilted forwardly downward by lowering the control rod 4B1 (which is guided by the corresponding cam track). As a result, the separated portions of the egg content are discharged from the respective cups 4A, 4B into corresponding chutes (not shown).

According to the embodiment described above, each of the knife members 3R, 3L is pivotally connected to the knife mount 210 of the corresponding receiver member 2R, 2L by means of the connecting pin 39 inserted into the pin support tube 211 which alone can provide a sufficiently stable support for the connecting pin 39. Thus, the knife member nor the knife mount need not be made of a channel member which inevitably provides a difficultly accessible portion for cleaning.

On the other hand, if no pin support tube 211 is provided, each of the knife mount 210 and the knife member need be made to have a channel portion to provide two support or connection points for the connecting pin 39, as disclosed in U.S. Pat. No. 3,480,056. In such a case, it will be difficult to clean the egg receiver 2 and knife assembly 3 which are most likely to be contaminated.

Further, most components of the egg breaking mechanism are made of stainless steel according to the illustrated embodiment. Apparently, the use of such a material provides ready washing of these components and reduces the possibility of bacterial breeding.

The present invention being thus described, it is obvious that the same may be varied in many ways. For instance, the cup assembly 4 may be replaced by another which is not capable of separately receiving the egg yolk and the egg white. Such variations are not to be regarded as a departure from the spirit and scope of the the invention, and all such modifications as would be obvious to those skilled in the art are intended to be included within the scope of the following claims.

I claim:

1. An egg breaking mechanism comprising:
a support;
an egg receiver mounted to the support for receiving an egg, the egg receiver including a pair of receiver members movable toward and away from each other, each of the receiver members having a knife mount;

an egg presser mounted to the support above the egg receiver for pressing the egg against the egg receiver;

a knife assembly including a pair of knife members each pivotally connected to the knife mount; and a cup assembly mounted to the support below the egg receiver for receiving a discharged content of the egg;

wherein the knife mount of said each receiver member is integrally formed with a laterally extending pin support tube, each of the knife members is pivotally connected to the knife mount by means of a connecting pin inserted into the pin support tube.

2. The egg breaking mechanism according to claim 1, wherein each of the knife members is pivotally urged toward the egg by a coil spring fitted around the pin support tube.

3. The egg breaking mechanism according to claim 1, wherein the pair of receiver members are swingably supported on a common center shaft fixed to the support, the pair of receiver members being urged toward each other by a return spring which has a central arcuate portion arranged to clear the common center shaft, the return spring further having a pair of side arcuate portions continuous with the central arcuate portion, the central and side arcuate portions being contained in a single plane.

4. The egg breaking mechanism according to claim 1, wherein the cup assembly comprises a separating cup arranged at a higher position and an albumen cup arranged at a lower position, the separating cup being formed with a separation slot which progressively reduces in width in a downward direction.

5. The egg breaking mechanism according to claim 1, wherein the cup assembly comprises an elongate cup mount which is bent at an obtuse angle and reinforced by a longitudinal rib.

6. The egg breaking mechanism according to claim 1, wherein the support comprises a base mount and a base member removably mounted to the base mount.

7. The egg breaking mechanism according to claim 6, wherein the base mount has a support shelf formed with a fitting slot while the base member has a fitting projection removably engaging in the fitting slot.

8. The egg breaking mechanism according to claim 6, wherein the base member is provided with means for carrying a retainer spring which has a pair of loop portions, the base mount is provided with a pair of engaging pins penetrating through the base member into removable engagement with the respective loop portions of the retainer spring.

9. The egg breaking mechanism according to claim 8, wherein the means for carrying the retainer spring comprises oppositely oriented pawls.

* * * * *